United States Patent [19]
Kamachi

[11] 3,783,270
[45] Jan. 1, 1974

[54] FOCUS INDICATING DEVICES

[75] Inventor: Shinichi Kamachi, Tokyo, Japan

[73] Assignee: Olympus Optical Company Limited, Tokyo, Japan

[22] Filed: May 17, 1972

[21] Appl. No.: 254,313

[30] Foreign Application Priority Data
May 19, 1971 Japan.............................. 46/33237

[52] U.S. Cl.............. 250/201, 250/234, 250/237 G, 356/126
[51] Int. Cl............................. G01j 1/20, H01j 3/14
[58] Field of Search..................... 356/126; 250/201, 250/204, 234, 237 G

[56] References Cited
UNITED STATES PATENTS

| | | | |
|---|---|---|---|
| 2,254,548 | 9/1941 | Ruhle et al. | 356/126 |
| 2,818,775 | 1/1958 | Ullrich | 356/126 |
| 3,175,093 | 3/1965 | DeLang | 250/237 G |
| 3,520,625 | 7/1970 | Gillieron et al. | 250/201 |
| 3,454,772 | 7/1969 | Vitt, Jr. et al. | 250/234 |
| 3,542,475 | 11/1970 | Cooper | 356/126 |

*Primary Examiner*—John K. Corbin
*Assistant Examiner*—V. P. McGraw
*Attorney*—Eric H. Waters et al.

[57] ABSTRACT

Focus indicating device for use in optical measuring devices comprises a light source, a condenser lens, a grating provided at its periphery with equidistant and parallel lines and adapted to be moved, an objective lens, an object to be measured and a photoelectric converter element. The grating is located in front of the photoelectric converter element and the light rays emanated from the light source after passing the objective lens, the object to be measured and the grating are impinged on the photoelectric converter element. The grating is moved such that the light rays are traversed by the lines of the grating to generate from the photoelectric converter element a signal for indicating the focal condition of the objective lens.

4 Claims, 11 Drawing Figures

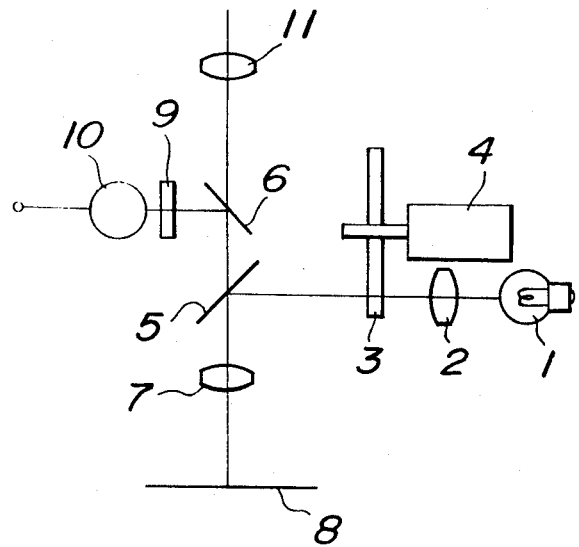
FIG_1
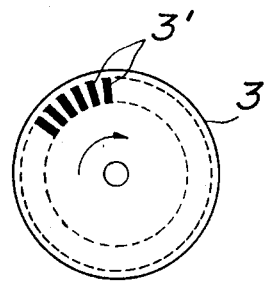
FIG_2
FIG_3

FIG_4
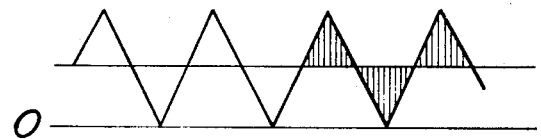
FIG_5
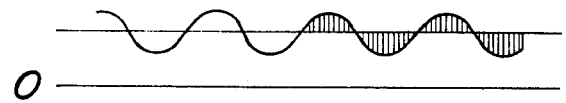
FIG_6
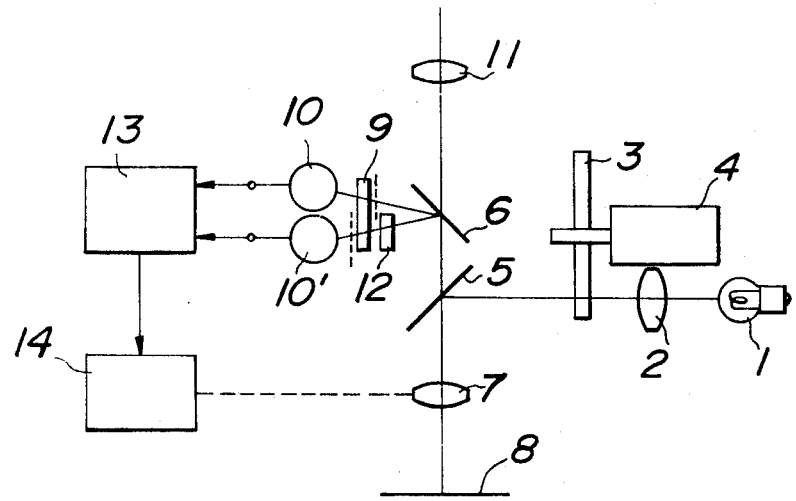

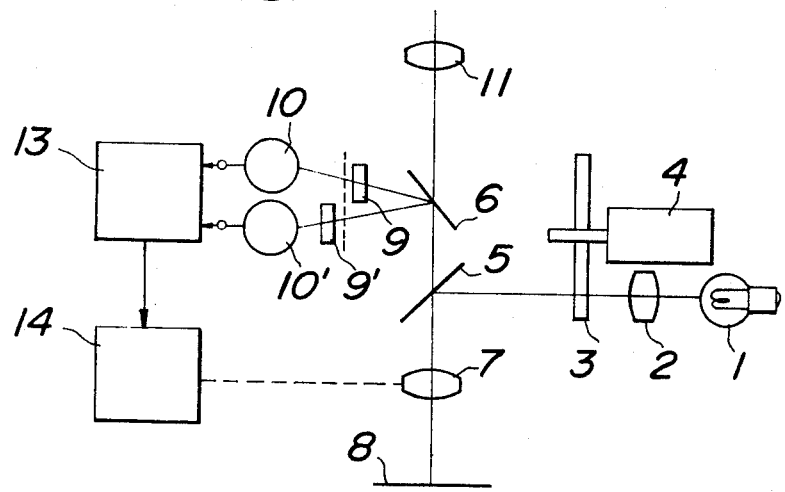
FIG_7
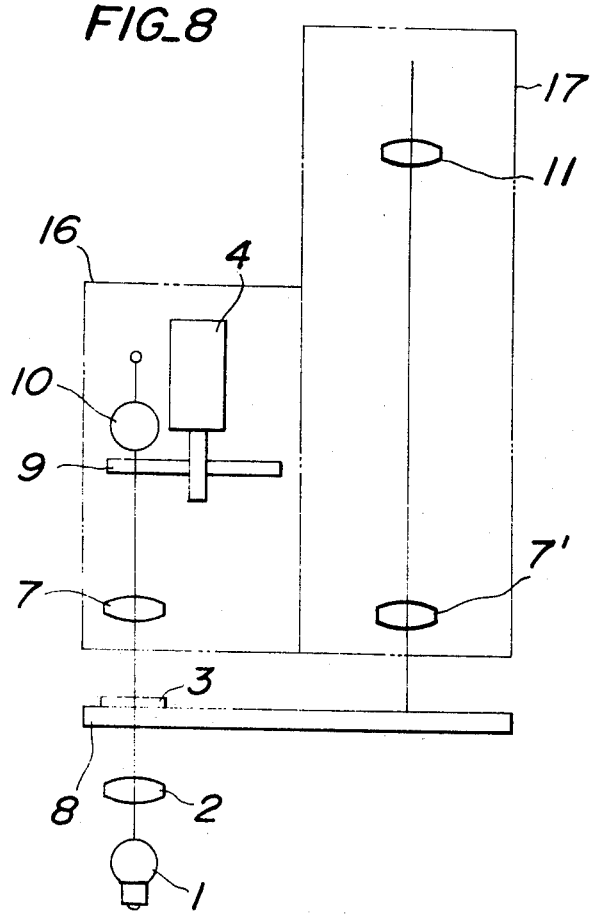
FIG_8

FIG_9
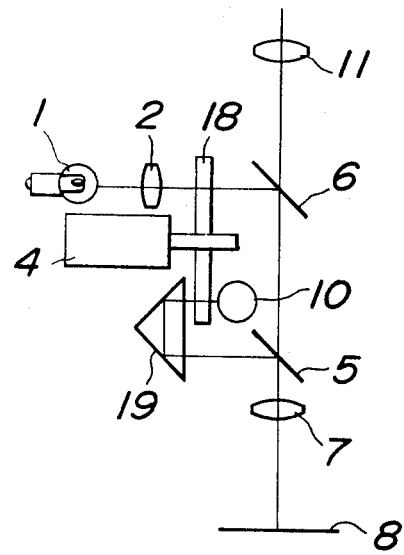
FIG_10
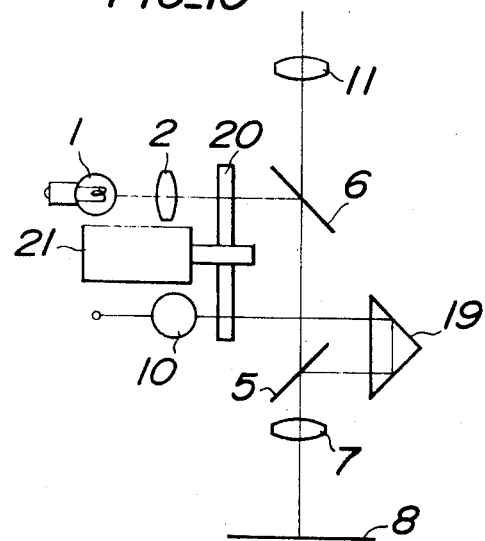
FIG_11
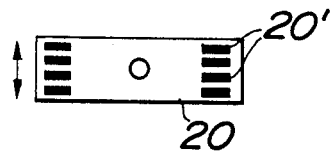

3,783,270

FOCUS INDICATING DEVICES

This invention relates to focus indicating devices and more particularly to a device for indicating the focus condition of an objective lens and adapted for use in measuring the distance between the objective lens and an object to be measured in the direction of the optical axis without being in contact with the object, for use in indicating the condition that the objective lens is in focus, and for use in autofocussing the objective lens, that is, automatically fixing the objective lens at its true focal point.

In a microscope for use in, for example, optical measuring devices, it has been the common practice to use an objective lens having a low magnification in the order of 5X's to 10X's, and as a result, the allowable range of the focus of the objective lens is so wide that it is difficult to fix the focus of the objective lens at its true focal point.

As a focus indicating device in which the focus of the objective lens is determined without visual aids, it has heretofore been proposed to provide a photoelectric converter element such as a CdS layer upon which surface is produced the image of an object to be measured through an objective lens and the photoelectric signal obtained from the CdS layer is used to indicate the focus condition of the objective lens. Such known focus indicating device is simple in construction, but has the disadvantage that the focus of the objective lens can not accurately be indicated and, as a result, it can not be applied to optical measuring devices. A further disadvantage is that highly accurate indications of the focus of the objective lens can not be obtained even if use is made of a complex and expensive construction.

It is an object of the invention to provide a focus indicating device which is simple in construction and is capable of reliably and accurately indicating the focal condition of the objective lens in a comparatively easy manner.

This and other desirable objects are attained, according to the invention, by a focus indicating device comprising a light source, a condenser lens, a grating provided at its periphery with equidistant and parallel lines and adapted to be moved, an objective lens, an object to be measured, and a photoelectric converter element, the arrangement being such that the light rays emanated from said light source pass through said condenser lens, grating, objective lens and the surface of said object and impinge on said photoelectric element, said grating being located in front of said photoelectric converter element and moved such that said light rays are traversed by the lines of said grating, thereby generating from said photoelectric converter element a signal for indicating the focal condition of said objective lens.

This and other features of the invention are described in greater detail in the following description of certain embodiments. This description refers to the accompanying drawings, in which:

FIG. 1 is a diagrammatic illustration of one embodiment of a focus indicating device according to the invention;

FIG. 2 is a plan view of a first rotatable grating;

FIG. 3 is a plan view of a second fixed grating suitable for use in combination with the first rotatable grating shown in FIG. 2;

FIG. 4 is a wave form of a photoelectric signal generated from the photoelectric converter element when the objective lens is in focus;

FIG. 5 is a wave form of a photoelectric signal generated from the photoelectric converter element when the objective lens is not in focus;

FIG. 6 is a diagrammatic illustration of another embodiment of the focus indicating device according to the invention suitable for use in autofocussing devices;

FIG. 7 is a diagrammatic illustration similar to FIG. 6 but showing an alternate version of the second fixed grating;

FIG. 8 is a diagrammatic illustration of another embodiment of the focus indicating device according to the invention suitable for use in finders;

FIG. 9 is a diagrammatic illustration of a further embodiment of the focus indicating device according to the invention in which use is made of one rotatable grating;

FIG. 10 is a diagrammatic illustration of a variant of FIG. 9 in which use is made of one vibrating grating; and FIG. 11 is a plan view showing the vibrating grating shown in FIG. 10.

Referring to FIG. 1, element 1 is a light source, element 2 is a condenser lens, element 3 is a first rotatable grating, element 4 is a motor for rotating the rotatable disc semitransparent mirrors 3, 5 and 6, element 7 is an objective lens, element 8 is an object to be measured, element 9 is a second fixed grating, element 10 is a photoelectric converter element, and element 11 is an eyepiece.

In FIG. 2 is shown an example of the construction of the first grating 3. As shown in FIG. 2, the first grating 3 comprises a transparent disc provided along its periphery with a number of close equidistant and parallel opaque lines 3' each arranged in a radial direction and adapted to be rotatable around the center axis. FIG. 3 shows an example of the construction of the second grating 9. As shown in FIG. 3, the second grating 9 comprises a transparent sector provided along its periphery with several close equidistant and parallel opaque lines 9' each arranged in a radial direction and adapted to be fixed.

The light rays emanated from the light source 1 pass through the condenser lens 2 and impinge on the first grating 3. The image of the first grating 3 is produced through the semitransparent mirror 5 and objective lens 7 on the surface of the object 8. The image of the first grating 3 thus produced on the surface of the object 8 is produced through the objective lens 7 and semitransparent mirrors 5 and 6 on the surface of the second grating 9. The light rays passed through the second grating 9 are impinged on the photoelectric converter element 10.

If the first grating 3 is rotated by the motor 4 and the focus of the objective lens 7 is accurately fixed on the surface of the object 8, an ideal triangular photoelectric signal shown in FIG. 4 is generated from the photoelectric converter element 10. In FIG. 4, the lowest value of the triangular signal is black level which is zero level in the ideal case, while the highest value of the triangular signal is the brightest level.

If the first grating 3 is rotated by the motor 4 and the focus of the objective lens 7 is not fixed on the surface of the object 8, that is, the image of the first grating 3 is not in focus, the corrugated wave form photoelectric signal shown in FIG. 5 is generated from the photoelectric converter element 10.

As a result, the suitable treatment of the photoelectric signal generated from the photoelectric converter element 10 is capable of obtaining a signal for indicating the focus condition of the objective lens 7. For example, the photoelectric signal generated from the photoelectric converter element 10 may be treated in a manner such that the alternating current component of the photoelectric signal generated from the photoelectric converter element 10 is rectified into a direct current component which is converted into a focus indicating signal. As seen from a comparison between FIGS. 4 and 5, if the focus of the objective lens 7 is correctly adjusted such that the focus of the objective lens 7 is accurately fixed on the surface of the object 8, the alternating current component of the photoelectric signal becomes very large as shown in FIG. 4 and, as a result, a large rectified direct current output can be obtained. On the contrary, if the focus of the objective lens 7 is slightly displaced from the surface of the object 8, the alternating current component of the photoelectric signal becomes very small and, as a result, a very small rectified direct current output can be obtained.

Moreover, if the focus of the objective lens 7 is accurately fixed on the surface of the object 8, the photoelectric signal from the photoelectric converter element 10 becomes triangular in wave form as shown in FIG. 4, while if the focus of the objective lens 7 is displaced from the surface of the object 8, the photoelectric signal from the photoelectric converter element 10 is deprived of higher harmonic components and hence approaches a fundamental sine wave as shown in FIG. 5. Thus, it is possible to supply the photoelectric signal to a band-pass filter adapted to pass higher harmonics, for example, a third harmonic and the third harmonic output of the band-pass filter may be used as a signal for indicating focus.

In the embodiment shown in FIG. 1, the light rays emanated from the light source 1 pass through twice the air space between the objective lens 7 and the surface of the object 8 so that the change of the photoelectric signal from the photoelectric converter element 10 becomes considerably large when the objective lens 7 is not in focus, thereby significantly improving the sensitivity of indicating the focus condition of the objective lens 7.

The above-mentioned way of indicating the focus condition of the objective lens 7 may simultaneously be effected in case of measuring the enlarged image of the surface of the object 8 by means of the objective lens 7 and eyepiece 11. In this case, the light rays emanated from the light source 1 do not prevent the measurement of the surface of the object 8 by means of the objective lens 7 and eyepiece 11. This is because of the fact that the first grating 3 rotated at a speed faster than a suitable speed is capable of viewing the image of the first grating 3 without flickering of light resulting from the residual image effect.

The light rays emanated from the light source 1 and reflected by the surface of the object 8 are partly reflected by the semitransparent mirror 6 and impinged on the second grating 9 to form Moire pattern thereon. Thus, the present embodiment is capable of accurately indicating the focus condition of the objective lens 7 irrespective of the presence of local indentations on the surface of the object 8. Moreover, since the light rays emanated from the light source 1 pass through the objective lens 7 per se of the microscope (TTL system), the focus condition of the objective lens 7 can be indicated in an extremely accurate manner.

As stated hereinbefore, the focus condition of the objective lens 7 can be indicated by treating the photoelectric signal from the photoelectric converter element 10. In this case, the photoelectric signal from the photoelectric converter element 10 is supplied to a meter whose indicator needle indicates the condition that the objective lens 7 is in focus.

The magnification of the objective lens 7 of the microscope for use in optical measuring devices is often low so that the allowable range of the focus of the objective lens 7 is wide and, as a result, it is difficult to fix by naked eyes the focus of the objective lens 7 at its true focal point on the surface of the object 8. As stated hereinbefore, the invention renders it possible to fix accurately the focus of the objective lens 7 at its true focal point by indicating the focal condition with the aid of the meter.

Moreover, the use of the output from the photoelectric converter element 10 insures generation of the signal for indicating the focus condition of the objective lens 7, and further provides the important advantage that the focus indicating signal can adjust the microscope body tube and control a servomechanism for adjusting the focal position of the objective lens 7, thereby effecting automatically the keeping of the objective lens 7 in focus.

In such autofocussing devices, it is necessary not only to keep the objective lens 7 in focus, but also to detect whether or not the focus of the objective lens 7 is displaced forwards or rearwards from its true focal point. In order to detect such forward or backward displacement of the focus from its focal point, the second grating 9 is provided at its front side with a glass plate 12 adapted to elongate the light ray path and provided at its rear side with two photoelectric converter elements 10, 10' as shown in FIG. 6. The focus indicating light rays reflected by the semitransparent mirror 6 are impinged through the second grating 9 on one of the photoelectric converter element 10 and are impinged through the glass plate 12 and the second grating 9 on the other photoelectric converter element 10'. In the present embodiment, the second grating 9 is located at a position between the position of the back focus of the objective lens 7 reflected by the semitransparent mirror 6 (dotted lines) and the position of the back focus of the objective lens 7 reflected by the semitransparent mirror 6 and extended by the glass plate 12 (dotted lines). The provision of the two photoelectric converter elements 10, 10' and the glass plate 12 results automatically in that when the outputs from the photoelectric converter elements 10, 10' become equal to each other a signal showing that the objective lens 7 is in focus is generated and also is capable of detecting the displacement of the objective lens 7 from its true focal point. For this purpose, the outputs from the photoelectric converter elements 10, 10' are supplied to a signal treating circuit 13 that treats the outputs in a suitable manner to generate a focus indicating signal which is supplied to a servomechanism 14 adapted to adjust the distance between the objective lens 7 and the object 8, with the result that the focus of the objective lens 7 can automatically and accurately be fixed at the surface of the object 8 in the well known technique.

Another possible embodiment of the autofocussing device which permits of detecting the displacement of the focus of the objective lens 7 from its true focal point is shown in FIG. 7. In this embodiment, the second grating 9 is divided into two grating portions 9 and 9' which are displaced along the optical axis and the light rays passed through the second grating portions 9 and 9' are impinged on the two photoelectric converter elements 10, 10', respectively. The back focus of the objective lens 7 is located at a point between the second grating portions 9 and 9' as shown by dotted lines in FIG. 7. The condition that the outputs from the two photoelectric converter elements 10, 10' are equal each other shows that the objective lens 7 is in focus. The comparison between the two outputs from the two photoelectric converter elements 10, 10' permits of detecting the displacement of the focus of the objective lens 7 from its true focal point in a forward or backward direction.

As stated hereinbefore, the output from the photoelectric converter element 10 or elements 10, 10' can be treated to obtain a signal for indicating the focus of the objective lens 7 and the signal can be utilized to continuously measure the distance from the object 8 to the objective lens 7 in a direction of the optical axis without touching the object 8. When the object 8 is disposed on a movable table (not shown) and the object 8 is moved to be scanned by the light rays, the focus indicating signal is used to adjust the distance between the objective lens 7 and the object 8 such that the focus of the objective lens 7 is fixed on its true focal point on the surface of the object 8. The distance between the objective lens 7 and the object 8 may be measured by a suitable means to detect the height of the object 8 in a direction perpendicular to the object 8.

The present embodiment may be applied to a conventional photoelectric microscope provided with a slit or pinhole and adapted to dispose the object 8 on a table movable in X and Y directions and hence move the object 8 together with the table in X and Y directions to be scanned by the slit or pinhole and to generate a photoelectric signal for detecting the end face position of the object 8. In such case, the table movable in X and Y directions is capable of obtaining the X and Y co-ordinates of the object 8 and the output of the photoelectric converter element 10 makes it possible to obtain Z co-ordinate of the object 8 as described above, and the provision of a low-pass filter adapted to pass a low frequency which is lower than the frequency for operating the focus indicating device permits of detecting the end face position of the object 8.

In FIG. 8 is shown another embodiment of the focus indicating device according to the invention. In the present embodiment, the light rays emanated from the light source 1 pass through the condenser lens 2 and impinge on the first grating 3 formed by a part of a cover glass disposed on the object 8. The image of the first grating 3 is produced on the surface of the second grating 9 by means of the objective lens 7 and the light rays passed through the second grating 9 are impinged on the photoelectric converter element 10. In the present embodiment, the first grating 3 is made fixed while the second grating 9 is made rotatable and is rotated by means of the motor 4. The objective lens 7, second grating 9 and photoelectric converter element 10 are enclosed in a casing 16 which is detachably secured to a microscope body tube 17 enclosing an objective lens 7' and eyepiece 11 therein. The distance from the objective lens 7 to the surface of the object 8 is made equal to the distance from the objective lens 7' of the microscope to the surface of the object 8. The focus indicating device according to the present embodiment plays a role of a finder which can accurately fix the focus of the objective lens 7' of the microscope at the surface of the object 8. The first grating 3 is described as is formed by the cover glass, but such construction is not always necessary. The first grating 3 per se may also be disposed on the object 8.

In FIG. 9 is shown a further embodiment of the focus indicating device according to the invention. In the present embodiment, provision is made of one rotatable grating 18 through which are passed two times the light rays. That is, the light rays emanated from the light source 1 are concentrated by the condenser lens 2 upon the rotatable grating 18 driven by the motor 4. The image of this grating 18 is produced through the semitransparent mirrors 6, 5 and objective lens 7 on the surface of the object 8. The light rays reflected by the surface of object 8 are impinged through the objective lens 7, semitransparent mirror 5 and a reversing prism 19 on the surface of the rotatable grating 18, with the result that the image of the rotating grating 18 produced on the object 8 is produced again on the rotating grating 18. The direction of rotation of the image produced on the rotating grating 18 is opposite to the direction of rotation of the rotating grating 18, and as a result, the light rays passed through the rotating grating 18 and impinged on the photoelectric converter element 10 is capable of giving a focus indicating signal which is the same as that generated by the above mentioned embodiments.

FIG. 10 shows a variant of the embodiment shown in FIG. 9, in which provision is made of a grating 20 adapted to be vibrated in a direction perpendicular to the plane of the drawing. The grating 20 is made of a rectangular transparent plate and provided at its upper and lower edges thereof with close equidistant and parallel opaque lines 20' and driven by a driving device 21 is directions shown by arrows in FIG. 11. The light rays emanated from the light source 1 pass through the condenser lens 2 and impinge on the vibrating grating 20. The image of the vibrating grating 20 is produced through the semitransparent mirrors 6, 5 and objective lens 7 on the surface of the object 8. The ight rays reflected by the object 8 are impinged through the objective lens 7, semitransparent mirror 5 and reversing prism 19 on the vibrating grating 20. The direction of vibration of the image of the vibrating grating 20 produced on the vibrating grating 20 is opposite to the direction of vibration of the vibrating grating 20, and as a result, the light rays passed through the vibrating grating 20 are impinged on the photoelectric converter element 10, thereby generating a signal for indicating the focus condition of the objective lens 7.

The embodiments of the invention shown in the drawings is for the purpose of describing the objects and features of the invention. It is to be understood, however, that modifications, changes and alterations may be made without departing from the scope and spirit of the invention.

What is claimed is:

1. A device for indicating the focus of an objective lens of a microscope while observing the image of an object to be tested through the objective lens, which comprises a microscope including an eyepiece, an objective lens and an object to be tested; and an optical system constituting a part of said microscope and including a light source, a condenser lens, a grating having upper and lower half portions provided with equidistant and parallel opaque lines and a photoelectric converter element, said grating being rotated at a speed faster than the residual image effect of eyes, whereby the light rays emanated from said light source and passed through said condenser lens is impinged on the upper half portion of said grating whose image produced on the object to be tested is impinged on the lower half portion of said grating to form a Moire pattern thereon and the correct focus position of said objective lens is indicated by the output signal of said photoelectric converter element when the contrast of said Moire pattern becomes maximum without preventing the observation of the surface of the object to be tested by said microscope.

2. A focus indicating device as claimed in claim 1 wherein said grating consists of a first movable grating and a second fixed grating and the light rays emanated from said light source after passing through said first movable grating are reflected by the surface of said object and impinged through said second grating on said photoelectric converter element.

3. A focus indicating device as claimed in claim 2 wherein said second grating is provided at its front side with a glass plate adapted to elongate said light ray path and provided at its rear side with two photoelectric converter elements, said light ray path being passed through said second grating to one of said two photoelectric converter elements and passed through said glass plate and said second grating to another photoelectric converter element, the outputs from said two photoelectric converter elements being supplied to a signal treating circuit whose output is supplied to a servomechanism adapted to control said objective lens.

4. A focus indicating device as claimed in claim 2 wherein said second grating is divided into two grating portions each of which is provided at its rear side with a photoelectric converter element, said light ray path being passed through said two second grating portions to said two photoelectric converter elements, the outputs from said two photoelectric converter elements being supplied to a signal treating circuit whose output is supplied to a servomechanism adapted to control said objective lens.

* * * * *